Nov. 8, 1932.  O. W. YOUNG  1,887,176

CAGE FOR ANTIFRICTION BEARINGS

Filed April 3, 1929

INVENTOR
OTTO W. YOUNG,

BY Gales P. Moor

HIS ATTORNEY.

Patented Nov. 8, 1932

1,887,176

UNITED STATES PATENT OFFICE

OTTO W. YOUNG, OF EAST ORANGE, NEW JERSEY, ASSIGNOR TO GENERAL MOTORS CORPORATION, OF DETROIT, MICHIGAN, A CORPORATION OF DELAWARE

CAGE FOR ANTIFRICTION BEARINGS

Application filed April 3, 1929. Serial No. 352,166.

This invention relates to cages for antifriction bearings and comprises all the features of novelty herein disclosed. An object of the invention is to provide an improved cage for guiding and retaining a series of rolling elements. Another object is to provide a light, strong and efficient cage capable of accurate construction and economical production. To these ends and to improve generally and in detail upon devices of this character, the invention further consists in the various matters herein disclosed.

In its broader aspects, the invention is not necessarily limited to the particular embodiment selected for illustration in the accompanying drawing in which Fig. 1 is a side view of the cage partly in section.

Figure 1:
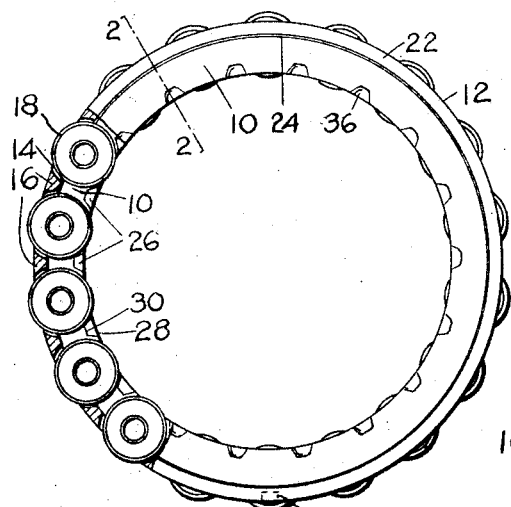
Figure 4:
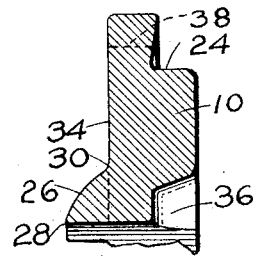
Fig. 4 is an enlarged section of an end ring.
Figure 5:
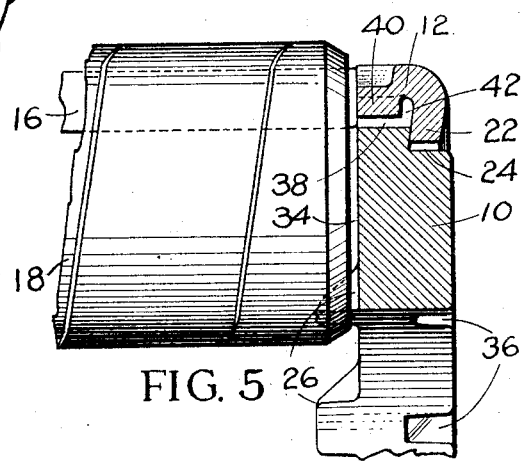
Fig. 5 is an enlarged detail section of the cage at one end of a roller opening.
Figure 2:
Fig. 2 is a section on line 2—2 of Fig. 1.
Figure 3:
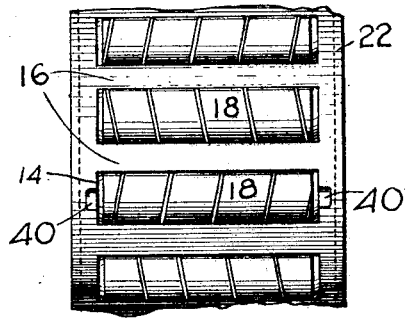
Fig. 3 is a partial front view of the cage.
Figure 6:
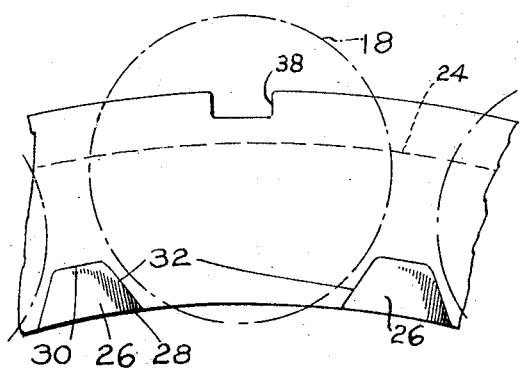
Fig. 6 is an enlarged side view of a portion of an end ring.

The numeral 10 indicates a pair of spaced end rings, each formed in one continuous piece, and the two rings are united by a circular band 12 having roller openings 14 alternating with cross connections 16 whose side edges are curved to conform to and guide a series of rollers 18 of suitable shape. The rollers may be solid or hollow but are herein shown as wound hollow cylinders with the ends chamfered. They are confined between the end rings with a small running clearance at their ends. The band 12 has both sides reduced in thickness to form circular shoulders at 20 which abut against the end rings and accurately space them. The thinner side portions of the band extend around the peripheries of the end rings and the edges 22 are spun down into circular grooves 24 in the end rings, the grooves preferably being undercut for better union with the band.

At the opposite periphery, each end ring has a series of projections 26 pressed or extruded from the material at the edge of the ring, the projections extending inwardly between pairs of adjacent roller ends. The projections are wider at 28, opposite the ring periphery, and narrower at 30 to present diverging side edges 32 towards the rollers and the ends are preferably convexly rounded. When the rollers are running between opposed raceways, they engage and are guided by the curved edges of the cross connections 16 but cannot engage the narrow projections 26 because they are held radially outwards by the usual inner race surfaces and are then held from circumferential movement by the cross connections though some slight play is allowed for free rotation. When, however, the cage and rollers are being handled apart from the raceway surfaces, the rollers are retained in the cage by contact with the surfaces 32 on the retaining projections 26 which are spaced apart a distance less than roller diameter even if the rollers have their ends reduced in size by chamfers. The convex surfaces on the projections increase somewhat the area of the surfaces 32 and avoid sharp corners at 28. The projections are short in relation to their thickness so as to diminish liability of displacement. The material can be shaped more easily at the edge of the ring than at the middle with less likelihood of deforming the rest of the ring and flat abutment faces 34 for the ends of the rollers are obtained. Extruding the projections from the edge of the ring itself economizes material. Recesses 36 are formed on the outside of the ring opposite the projections.

To prevent any possible relative rotation between the band and the end rings and to locate the projections 26 properly with respect to the cross connections 16, each end ring has a notch 38 in the periphery and a portion 40 of the band is extruded or pressed into the notch. The extruded portion fits between the sides of the notch but does not reach the bottom nor fill the end space at 42. The notch is located between an adjacent pair of cross connections and the extrusion is made in the band at an edge which defines one end of a roller opening where the material can be deformed easily without crowding into the roller opening. The connecting band eliminates necessity for individual tie bars with their usual multiplicity of riveted joints while the retaining projections at the edge of the ring allow either hollow or solid rollers to be used and leave the remainder of the ring flat to furnish large abutment areas for the ends of the rollers. When other forms of rollers are used, the roller openings are readily shaped to correspond.

I claim:

1. In a roller cage, a pair of end rings, cross connections holding the rings spaced apart, a series of rollers between the end rings, the cross connections guiding the rollers, roller retaining projections extruded from the material at one edge of each ring and extending inwardly between adjacent rollers, the projections being wider opposite the edge of the ring and narrower away from the edge to present converging retaining edges to the rollers; substantially as described.

2. In a roller cage, a pair of end rings, cross connections holding the end rings spaced apart, a series of rollers between the end rings, the edges of the cross connections guiding the rollers, a series of roller retaining projections extruded from the material at an edge of each ring and extending inwardly between the end portions of adjacent rollers, the projections being radially opposite the corresponding cross connections and having their roller retaining edges spaced apart to lie a greater distance from the rollers, in the running position of the bearing, than the corresponding cross connections; substantially as described.

3. In a roller cage, a pair of circular end rings, a circular band connecting the end rings and having roller openings alternating with cross connections, flat-ended rollers projecting through the openings, the edges of the cross connections conforming to and guiding the rollers substantially throughout their lengths, the end rings having their side faces flat at the ends of the roller openings and continuous and uninterrupted from the outer periphery to the inner periphery to present extensive flat guide surfaces to the flat roller ends, and said end rings having those portions of their inner edges which lie opposite to the cross connections extruded into the spaces between the rollers to form roller retaining projections, the projections being spaced apart to lie out of contact with the rollers when the latter are guided by the edges of the cross connections, and the projections being short in relation to their thickness to avoid displacement thereof; substantially as described.

In testimony whereof I hereunto affix my signature.

OTTO W. YOUNG.